US012608718B2

(12) United States Patent
Vincent et al.

(10) Patent No.: US 12,608,718 B2
(45) Date of Patent: Apr. 21, 2026

(54) STEERING COMPUTE WORKLOADS BASED ON CARBON COSTS

(71) Applicant: Hewlett Packard Enterprise Development LP, Spring, TX (US)

(72) Inventors: Mario Bertram Vincent, Bengaluru (IN); Troy William Heber, Greeley, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 326 days.

(21) Appl. No.: 18/361,738

(22) Filed: Jul. 28, 2023

(65) Prior Publication Data

US 2025/0037143 A1      Jan. 30, 2025

(51) Int. Cl.
G06Q 30/018          (2023.01)

(52) U.S. Cl.
CPC .................................. G06Q 30/018 (2013.01)

(58) Field of Classification Search
None
See application file for complete search history.

(56) References Cited

U.S. PATENT DOCUMENTS

2021/0373973 A1 * 12/2021 Ekins .................... G06F 9/5088

OTHER PUBLICATIONS

Piontek, Tobias, Kawsar Haghshenas, and Marco Aiello. "Carbon emission-aware job scheduling for Kubernetes deployments." Journal of supercomputing 80 (2023): 549-569. (Year: 2023).*
Bill Johnson, "Carbon-Aware Kubernetes", available online at <https://devblogs.microsoft.com/sustainable-software/carbon-aware-kubernetes/>, Oct. 5, 2020, 3 pages.
Intel, "Power Manager—Kubernetes Operator", Technology Guide, available online at <https://networkbuilders.intel.com/solutionslibrary/power-manager-a-kubernetes-power-operator-technology-guide>, Dec. 2, 2022, 22 pages.

* cited by examiner

*Primary Examiner* — Emmett K. Walsh
(74) *Attorney, Agent, or Firm* — Yao Legal Services, Inc.

(57)                    ABSTRACT

Techniques are provided for discerning energy consumption and carbon footprint data associated with hardware-as-a-service resources, and managing workloads based on carbon cost metrics. A management interface collects energy consumption information associated with a plurality of servers processing workloads in a cloud computing environment. The management interface monitors energy consumption in the plurality of servers. An energy consumption manager calculates carbon cost metrics for the plurality of servers based on the energy consumption information; identifies a subset of the servers as being underutilized based on the carbon cost metrics; and calculates an overall carbon cost of the plurality of servers. A workload manager generates container platform operation labels for the plurality of servers when the overall carbon cost is below a threshold value, such that a workload scheduled on the container platform migrates to one of the servers based on the container platform operation labels.

36 Claims, 6 Drawing Sheets

100

100

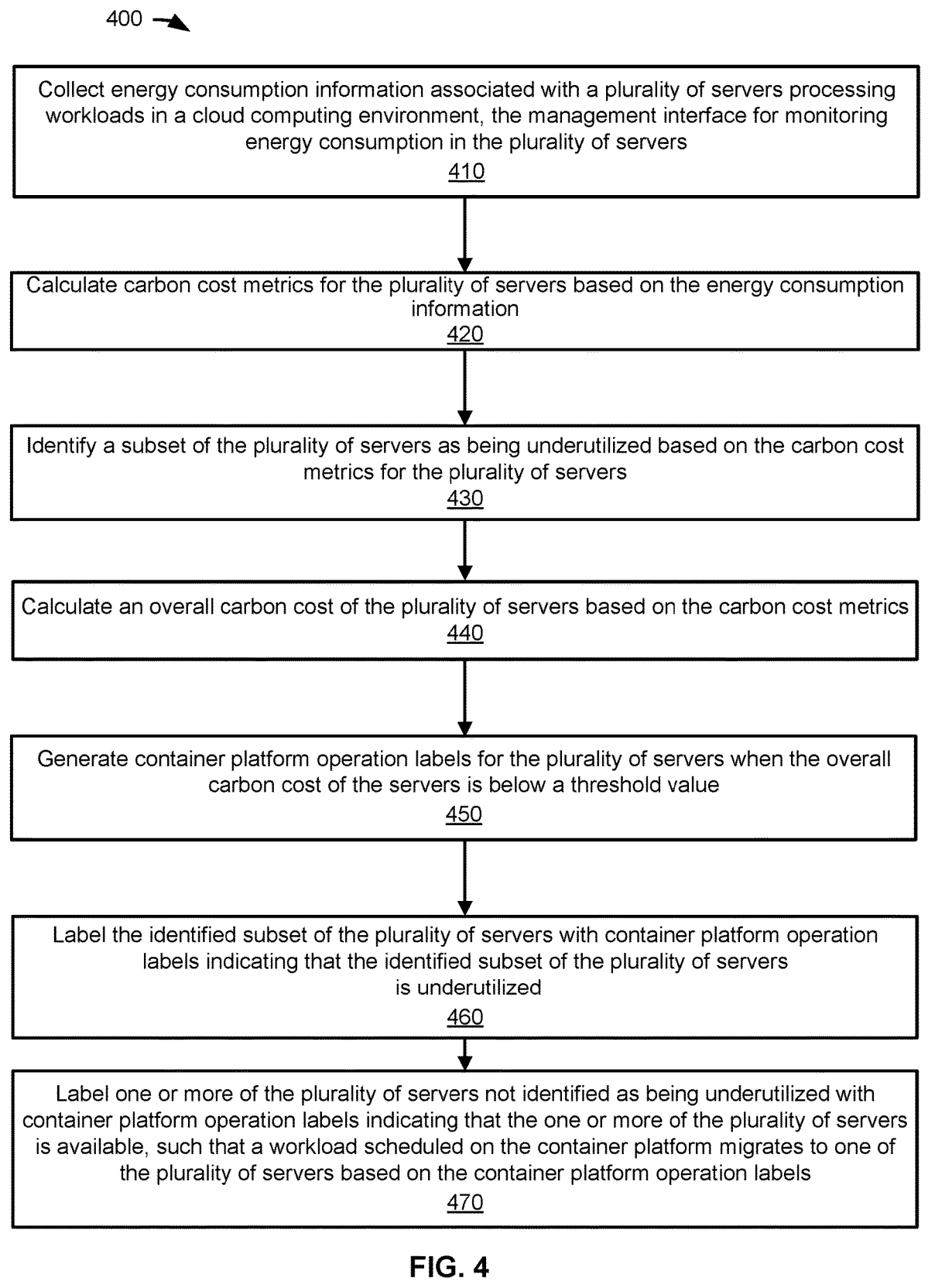

400 ➤

Collect energy consumption information associated with a plurality of servers processing workloads in a cloud computing environment, the management interface for monitoring energy consumption in the plurality of servers
410

Calculate carbon cost metrics for the plurality of servers based on the energy consumption information
420

Identify a subset of the plurality of servers as being underutilized based on the carbon cost metrics for the plurality of servers
430

Calculate an overall carbon cost of the plurality of servers based on the carbon cost metrics
440

Generate container platform operation labels for the plurality of servers when the overall carbon cost of the servers is below a threshold value
450

Label the identified subset of the plurality of servers with container platform operation labels indicating that the identified subset of the plurality of servers is underutilized
460

Label one or more of the plurality of servers not identified as being underutilized with container platform operation labels indicating that the one or more of the plurality of servers is available, such that a workload scheduled on the container platform migrates to one of the plurality of servers based on the container platform operation labels
470

FIG. 4

Computer-Readable Medium 500

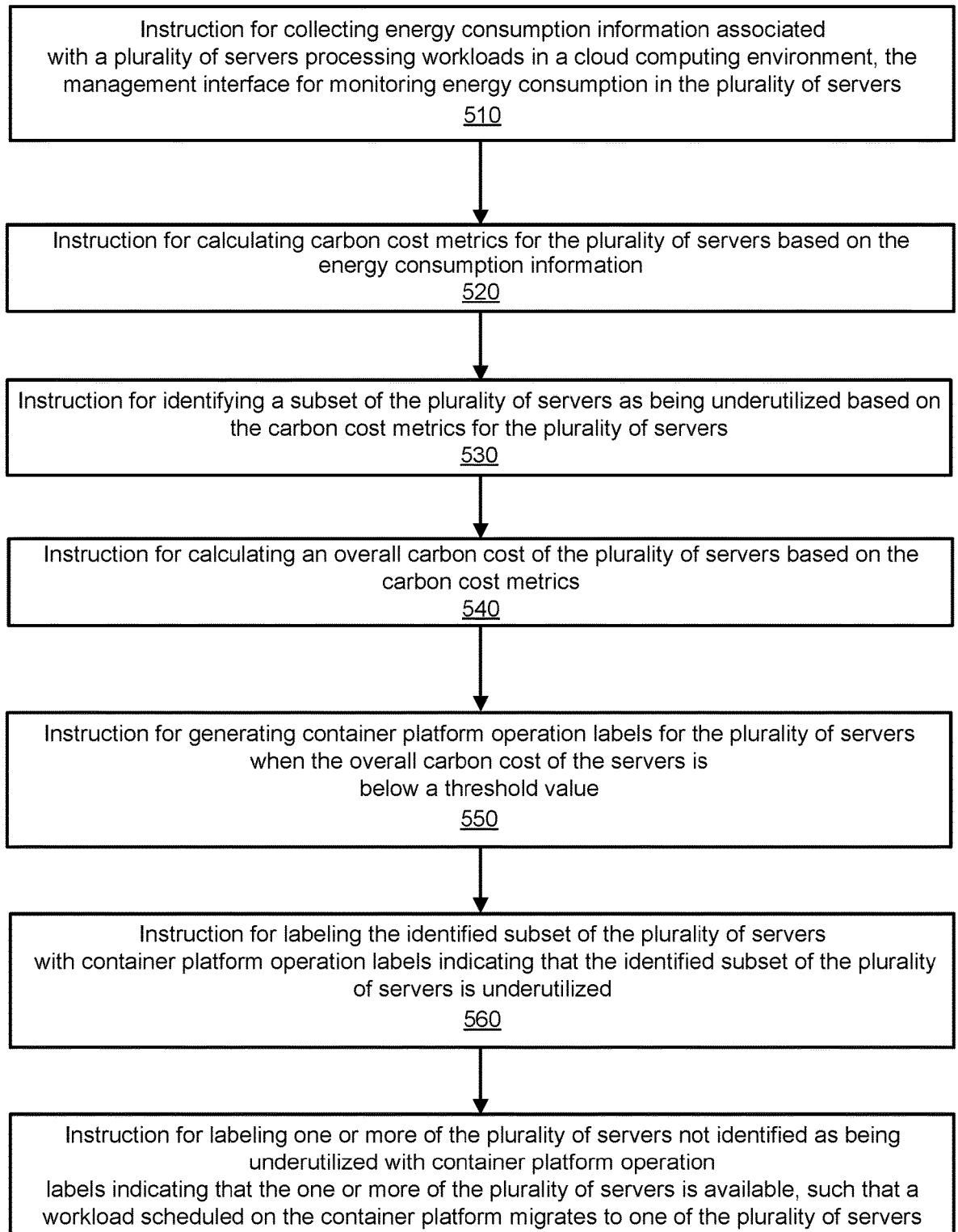

Instruction for collecting energy consumption information associated
with a plurality of servers processing workloads in a cloud computing environment, the
management interface for monitoring energy consumption in the plurality of servers
510

Instruction for calculating carbon cost metrics for the plurality of servers based on the
energy consumption information
520

Instruction for identifying a subset of the plurality of servers as being underutilized based on
the carbon cost metrics for the plurality of servers
530

Instruction for calculating an overall carbon cost of the plurality of servers based on the
carbon cost metrics
540

Instruction for generating container platform operation labels for the plurality of servers
when the overall carbon cost of the servers is
below a threshold value
550

Instruction for labeling the identified subset of the plurality of servers
with container platform operation labels indicating that the identified subset of the plurality
of servers is underutilized
560

Instruction for labeling one or more of the plurality of servers not identified as being
underutilized with container platform operation
labels indicating that the one or more of the plurality of servers is available, such that a
workload scheduled on the container platform migrates to one of the plurality of servers
based on the container platform operation labels
570

FIG. 5

STEERING COMPUTE WORKLOADS BASED ON CARBON COSTS

BACKGROUND

Environmental, Social, and Governance (ESG) issues are now major drivers in business policy. At the same time, virtualization and container ecosystems have matured sufficiently for IT providers to provision underlying hardware (e.g., server CPUs/CPU cores, GPUs, fans, etc.) that powers many customer-owned data center solutions.

BRIEF DESCRIPTION OF THE DRAWINGS

Various objects, features, aspects and advantages of the inventive subject matter will become more apparent from the following specification, along with the accompanying drawings in which like numerals represent like components.

FIG. 4 illustrates a flow diagram of a computerized method to manage workloads in accordance with an example.

FIG. 5 illustrates a computer-readable medium in accordance with an example.

Figure 1:
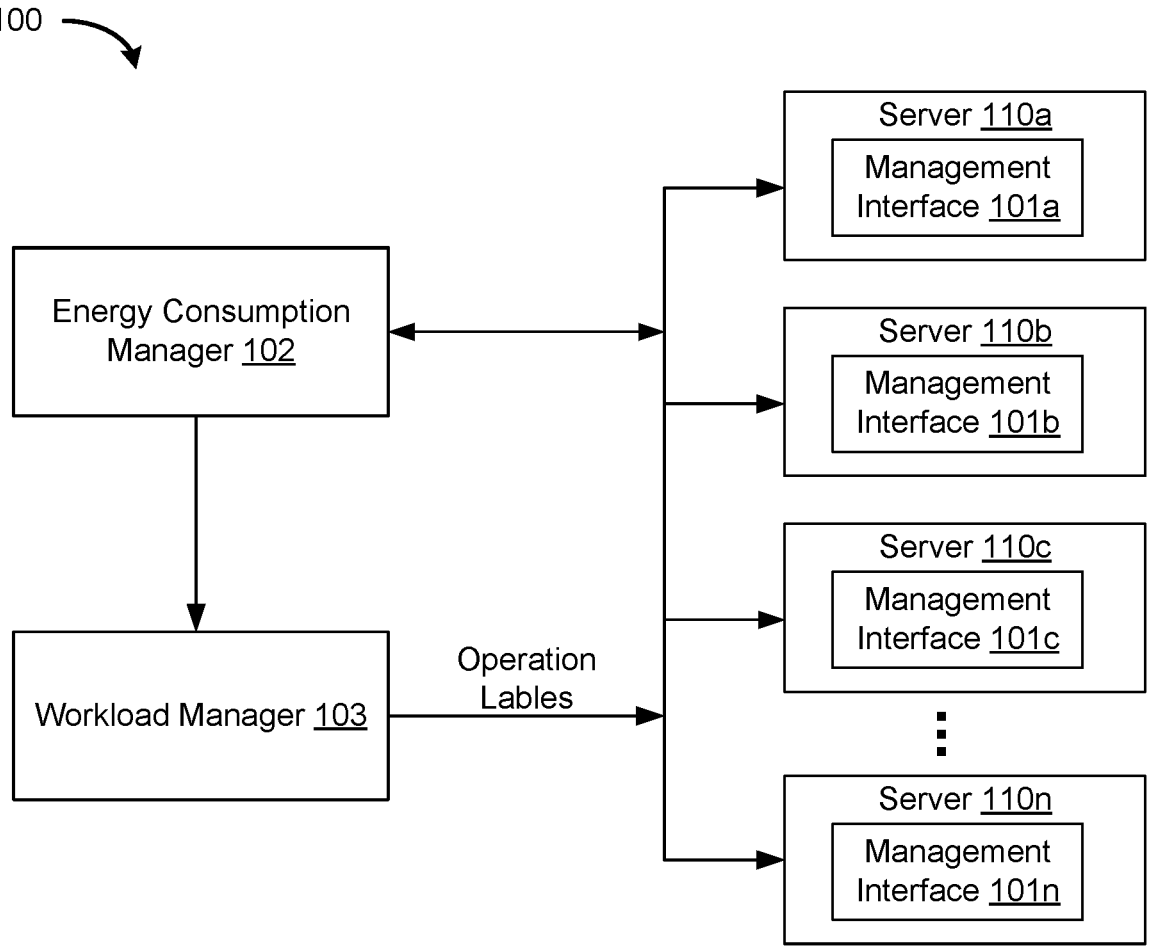
FIG. 1 is a diagram illustrating a cloud computing environment in accordance with some examples.

While the examples are described with reference to the above drawings, the drawings are intended to be illustrative, and other examples are consistent with the spirit, and within the scope, of the various examples herein.

DETAILED DESCRIPTION

Virtualization and container ecosystems have matured sufficiently for IT providers to provision underlying hardware that powers many customer-owned data center solutions. For example, the hardware can be server CPUs/CPU cores, GPUs, memories, network storages, and system infrastructures, such as fans and system boards, or the like. By using a hardware-as-a-service/multi-tenant consumer model, customers can consume the hardware based on their individual needs. But given the abstract nature of as-a-service/multi-tenant consumer models, there is a need for a way to discern energy consumption carbon cost metrics and carbon footprint data associated with the hardware-as-a-service resources used to support each individual customer's Environmental, Social, and Governance (ESG) credentials. The term "carbon cost metrics", as used herein, refers to a quantification of costs associated with various aspects of a "carbon footprint", i.e., a measurement of the amount of carbon dioxide and other carbon compounds emitted due to an energy consumption activity (e.g., cloud-based computing).

Traditionally, a fine-grained, top-down approach to managing CPU resource allocation and power management has been used for cloud environments. However, this top-down approach to allocate hardware, such as CPUs, in the cloud environment cannot ensure active servers are running at optimum capacity to meet each individual customer's desired goals. Therefore, in a computing environment using a hardware-as-a-service/multi-tenant consumer model, there is a further need to provide customers with the tools and mechanisms to meet overall carbon footprint goals, e.g., optimizing power usage so that active servers are running at optimum capacity while underutilized servers are shut off. These tools and mechanisms may include employing one or more techniques for: tagging servers with power utilization metrics or carbon footprint metrics so that overall carbon cost decisions can be based on server availability; workload scheduling that takes into account the overall carbon cost of a workload; or determining whether workloads are within a customer's desired energy consumption and carbon footprint envelope.

Thus, the present disclosure is directed to techniques for steering workloads based on carbon costs or energy costs in a cloud computing environment. A set of power utilization metrics is provided. The set of power utilization metrics may include metrics determined based on total power consumption, power consumed by CPUs, power consumed by GPUs, power consumed by memory, and/or power consumed by system infrastructures. The power utilization metrics can be collected by a management Interface (e.g., an application programming interface (API) for management of servers), which may be configured to monitor server energy consumption over a time interval. Carbon cost metrics are calculated based on a fractional energy utilization of workloads on servers, and workload modulation mechanisms are determined based on the carbon cost metrics. For example, workloads can be routed to servers based on a customer's desired energy consumption and carbon footprint envelope.

FIG. 1 is a diagram illustrating a cloud computing environment 100 in accordance with some examples. The cloud computing environment 100 includes a plurality of servers 110(*a-n*) configured to process workloads in the cloud computing environment 100. The plurality of servers 110(*a-n*) can refer generally to computing devices including one or more processors that perform operations to provide applications or services. In some examples, the cloud computing environment 100 can be a public cloud computing environment or a private cloud computing environment. For example, a public cloud computing environment including the plurality of servers 110(*a-n*) may provide storage and computational resources via a public communications network, such as the Internet, while a private cloud computing environment including the plurality of servers 110(*a-n*), e.g., in a server farm or data center, may provide storage and computational resources via a private network, such as a company's intranet.

The plurality of servers 110(*a-n*) in the cloud computing environment 100 includes a variety of hardware that consume energy and incur carbon costs. Examples of hardware in the plurality of servers 110(*a-n*) that consume energy may include central processing units (CPUs), graphics processing units (GPUs), memory devices, server infrastructure, etc. Examples of server infrastructure that consume energy (outside of CPUs, GPUs, and DRAMs) include system boards, cooling devices such as fans or water coolers, and other components. In a hardware-as-a-service/multi-tenant consumer model, customers can consume hardware as needed to process workloads based on their individual needs. Therefore, hardware usage on the plurality of servers 110(*a-n*) oftentimes varies due to customers' workload requirements. Accordingly, the energy consumption and carbon footprint cost for the plurality of servers 110(*a-n*) can also change dynamically over time. Therefore, it is difficult to keep active servers running at optimum capacity while meeting individual customers' energy goals using traditional methods of top-down hardware allocation.

The cloud computing environment 100 further comprises management interfaces 101(*a-n*) configured to monitor energy consumption in the plurality of servers 110(*a-n*), respectively. As shown in FIG. 1, each of the plurality of servers 110(*a-n*) comprises a management interface 101 (*a, b, c,* or *n*) for monitoring energy consumption. Further, the management interfaces 101(*a-n*) collect energy consumption information associated with the plurality of servers 110(*a-n*). The energy consumption information for the plurality of servers may comprise consumption information related to CPUs, GPUs, memory resources, or other cloud-computing elements. For example, energy consumption information may comprise energy consumed by a CPU, a GPU, a memory resource, a fan, an infrastructure, a complete server lifecycle (e.g., combined energy costs associated with manufacturing a server, transporting the server to a customer site, and end-of-life disposal of the server), or any combination thereof. This is described in detail further below with reference to FIG. 2.

The cloud computing environment 100 further comprises an energy consumption manager 102 in communication with the management interfaces 101(*a-n*). The energy consumption manager 102 calculates carbon cost metrics for the plurality of servers 110(*a-n*) based on the energy consumption information. The carbon cost metrics for the plurality of servers 110(*a-n*) may comprise, for example, any of the following: a carbon cost per CPU, a carbon cost per GPU, a carbon cost per megabyte of network read/write data, a carbon cost per megabyte of read/write data storage, a carbon cost per megabyte of memory used, or a carbon cost of a complete server lifecycle. Based on the carbon cost metrics for the plurality of servers 110(*a-n*), The energy consumption manager 102 identifies a subset of the plurality of servers 110(*a-n*) as being underutilized. The energy consumption manager 102 further calculates an overall carbon cost of the plurality of servers 110(*a-n*) based on the carbon cost metrics. Therefore, individual customers can discern the energy consumption and carbon footprint data associated with the hardware resources in the plurality of servers 110(*a-n*), as well as whether the overall carbon cost of the plurality of servers 110(*a-n*) meets their overall carbon footprint goals.

In some examples, the management interface 101 (*a, b, c,* or *n*) is configured to monitor server energy consumption over a time interval. The carbon cost metrics are calculated based on a fractional energy utilization of workloads on servers 110(*a-n*). In some examples, the management interface 101 (*a, b, c,* or *n*) collects instantaneous energy consumption values for the plurality of servers for a consumption period. The energy consumption manager 102 calculates the carbon cost metrics for the plurality of servers 110(*a-n*) by summing the instantaneous energy consumption values for a respective server over the consumption period. In some examples, the plurality of servers 110(*a-n*) includes at least a first type of server and a second type of server different from the first type server. The carbon cost metric for the first type of server is weighted differently from the carbon cost metric for the second type of server.

The cloud computing environment 100 further comprises a workload manager 103. When the overall carbon cost of the servers 110(*a-n*) is below a threshold value, the workload manager 103 generates a container platform operation label for the plurality of servers 110(*a-n*). The workload manager 103 labels the identified subset of the servers as being underutilized. The workload manager 103 labels the one or more of the plurality of servers not identified as being underutilized as available. As a result, a workload scheduled on the container platform migrates to one of the plurality of servers based on the container platform operation labels, as described in detail further below with reference to FIG. 3. Therefore, workload modulation mechanisms are determined based on the carbon cost metrics. For example, workloads can be routed to servers based on a customer's desired energy consumption and carbon footprint envelope.

Figure 2:
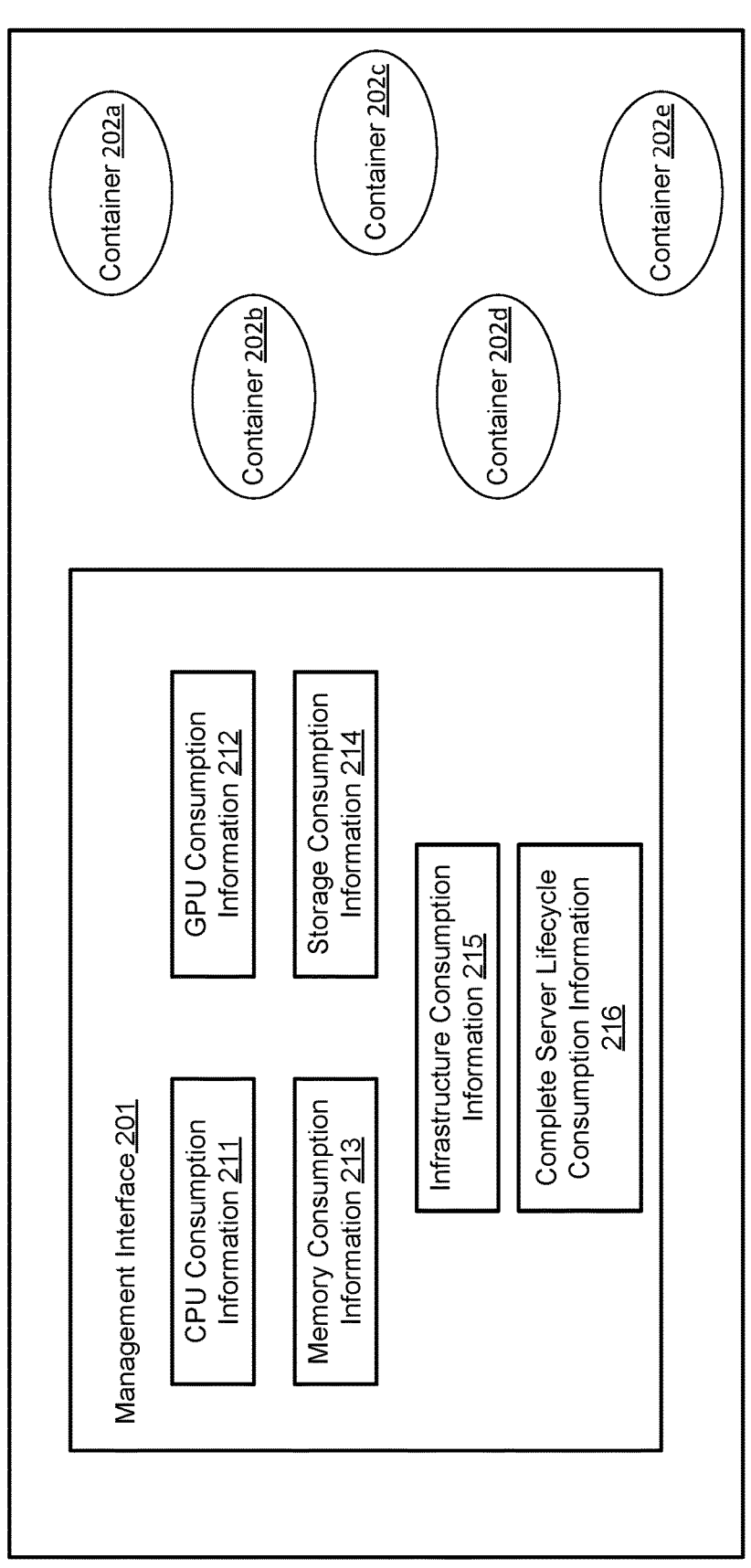
FIG. 2 illustrates an example server having a management interface configured to monitor energy consumption in accordance with some examples.

FIG. 2 illustrates a server 200 having a management interface configured to monitor energy consumption in accordance with some examples. The server 200 may be, for example, a respective server of the plurality of servers 110(*a-n*) as shown in FIG. 1. Similar to FIG. 1, the server 200 comprises a management interface 201 configured to monitor energy consumption and collect energy consumption information associated with hardware resources in the server 200. For example, the management interface 201 may be a RESTful interface for the management of servers, storage, networking, and/or converged infrastructure. The carbon footprint of the server 200 may depend on, for example, a configuration of the server 200 (e.g., a thermal design power of CPUs, number of server hard disks, network interface cards and other boards, etc.), how hot the server 200 is running (i.e., the operating temperature of the server), and/or on a method of electricity generation being used to power data centers. For example, "green" power sources, such as solar, wind, geothermal, or hydropower, can have lower carbon footprints compared to coal fired power plants, which may have a higher carbon footprint. In one example, a carbon footprint may be measured based on energy consumption over a time interval. In another example, the carbon footprint of the server 200 attributed to the manufacturing and transporting the server 200 may depend on the kinds of materials used to construct the server, where they are sourced from, the destination, and/or many other factors. Further, the carbon footprint of the server 200 attributed to end-of-life disposal of the server 200 may be fixed based on a recycling method.

As shown in FIG. 2, the energy consumption information associated with hardware resources may comprise CPU consumption information 211, GPU consumption information 212, memory consumption information 213, storage consumption information 214, infrastructure consumption information 215, and/or complete server lifecycle consumption information 216.

The CPU consumption information 211 may comprise a CPU energy cost per active core, i.e., per processor currently processing workloads. The active number of cores (AC) can be calculated using the follow equation:

$$AC = \frac{CPUUtil \times TCC}{100} + 1 \tag{1}$$

where CPUUtil is CPU utilization of the server 200; and TCC is the total number of cores in the server 200 that are available for applications and workloads to execute on. The total number of active cores can go to zero when the system is quiescent. For calculation purposes, the number "1" is added to ensure energy usage is attributed to at least one core.

The CPU energy cost per active core measures the instantaneous CPU consumption values per active core for a consumption period. The consumption period can be a second, a minute, an hour, a day, or another time period. If the consumption period is one second, the instantaneous CPU consumption values are in terms of Watts of electricity.

The GPU consumption information 212 may comprise a GPU energy cost per active core. The GPU energy cost per active core ($EC\_ACGS_n$) is calculated using the following equation:

$$EC\_ACGS_n = \frac{GpuWatts \times n}{60 \times 60 \times AC} \qquad (2)$$

where the time interval for measuring GPU consumption is one second, and the GPU power consumption values are in terms of Watts, also known as instantaneous GPU consumption values.

The memory consumption information 213 may comprise an energy cost per active core per dynamic random-access memory (DRAM). DRAM efficiency can vary by vendor (manufacturer), model generation, and/or memory size. The energy cost per active core per DRAM measures the instantaneous (per second) energy cost per megabyte (MB) of DRAM per active core. The instantaneous CPU consumption values are in terms of Watts of electricity.

The storage consumption information 214 may comprise one or more of an energy cost per megabyte of network read data, an energy cost per megabyte of network write data an energy cost per megabyte of read data storage, and/or an energy cost per megabyte of write data storage.

The infrastructure consumption information 215 may comprise an energy cost per active core per infrastructure. Examples of server infrastructure that consumes energy (outside of CPUs, GPUs, and DRAMs) include system boards, cooling devices such as fans or water coolers, and other components.

The complete server lifecycle consumption information 216 comprises a calculated energy cost attributed to one or more of: manufacturing the server 200, transporting the server 200 to a customer site, or end-of-life disposal of the server 200. The energy cost attributed to the manufacturing the server 200 and the transporting the server 200 may depend on the kinds of materials used to construct products, where they are sourced from, the destination, and/or many other factors. The carbon footprint of the server 200 attributed to end-of-life disposal of the server 200 may be fixed based on a recycling method. The calculated energy cost is based on an average life of the server 200. For example, the average life of the server 200 can be 4 years.

The server 200 further comprises a plurality of containers 202(a-e) configured to process workloads. To meet overall energy cost and carbon footprint goals, it is desirable to manage workloads such that each of the plurality of containers 202(a-e) is running at an optimum capacity. For example, workload management may comprise taking at least one of following actions with respect to server 200, if the server 200 is underutilized: migrating one or more containers 202(a-e) from the underutilized server 200 to another server; putting the underutilized server 200 into a power saving mode; powering off the underutilized server 200; putting the underutilized server 200 into a hibernation or sleep mode for a limited amount of time (e.g., a couple of hours or a day), etc.

In some examples, the actions taken with respect to server 200 can be initialized using container platform operation labels.

Figure 3:
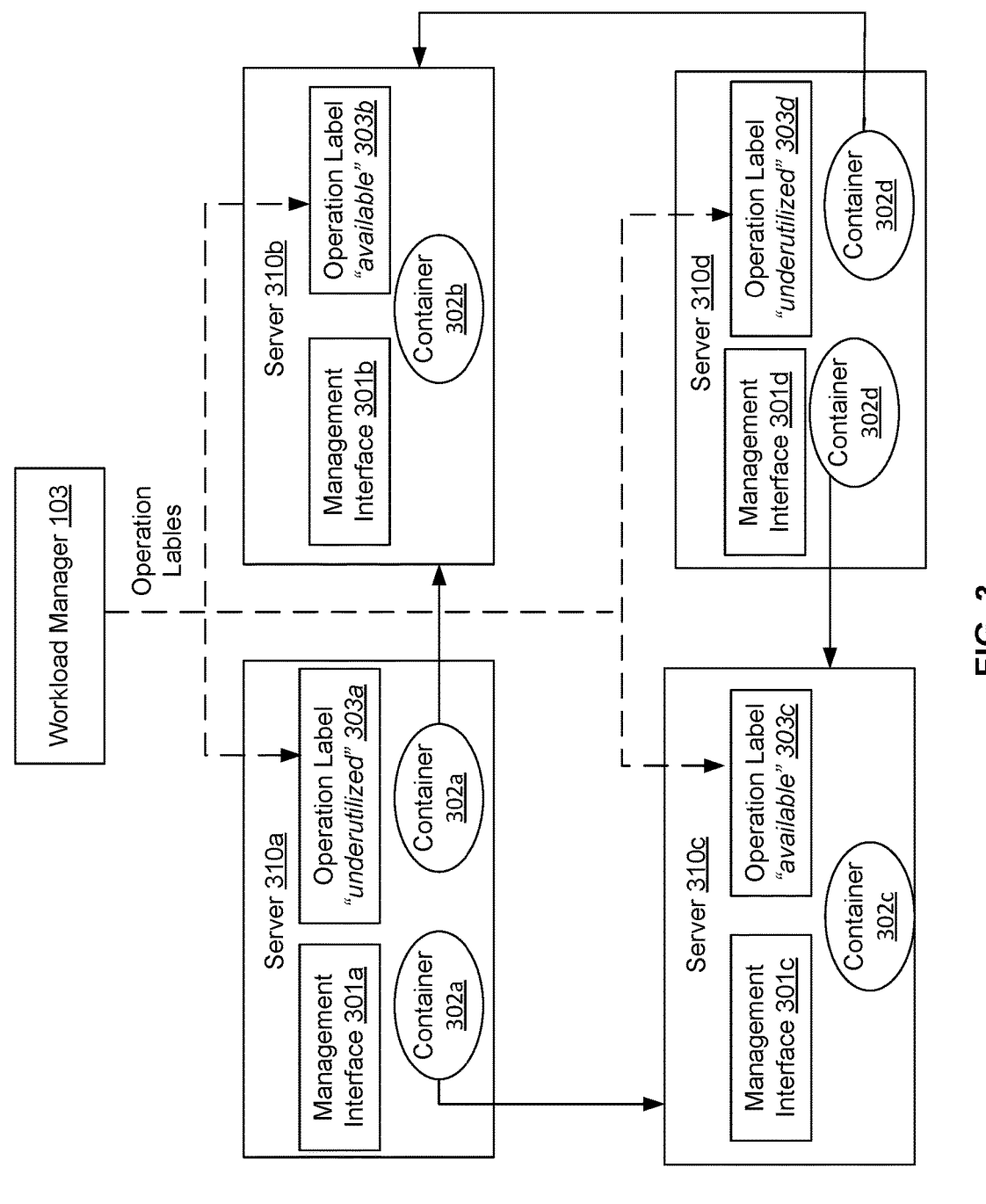
FIG. 3 illustrates an example cloud computing environment using container platform operation labels to manage workloads in accordance with some examples.

FIG. 3 illustrates a cloud computing environment 300 in which container platform operation labels are used to manage workloads in accordance with some examples. As shown in FIG. 3, the cloud computing environment 300 comprises a plurality of servers 310(a-d). Each of the plurality of servers 310 (a, b, c, or d) comprises a management interface 301 (a, b, c, or d) and at least one container 302 (a, b, c, or d). Each management interface 301 (a, b, c, or d) is configured to monitor energy consumption and collect energy consumption information within a respective server 310 (a, b, c, or d). The at least one container 302 (a, b, c, or d) is configured to process workloads in the cloud computing environment 300. Therefore, workload migrations in the cloud computing environment 300 can also be characterized as container 302 migrations between the plurality of servers 310(a-d).

The cloud computing environment 300 further comprises a workload manager 103 (e.g., workload manager 103 in FIG. 1). Based on the energy consumption information in each server 310(a-d), the workload manager 103 can generate a container platform operation label 303(a-d) for each of the servers 310(a-d). The workload manager 103 labels the underutilized servers as being underutilized, and labels the other servers not underutilized as being available. For example, an overall carbon cost of the plurality of servers 310(a-d) is below a threshold value, and servers 310a and 310d are identified as being underutilized. The subset of servers 310a and 310d is an identified subset of the plurality of servers. The servers 310b and 310c are the servers not identified as being underutilized. The workload manager 103 generates a container platform operation label of "underutilized" 303a for the server 310a and a container platform operation label of "underutilized" 303d for the server 310d. The workload manager 103 labels the identified subset of the plurality of servers 310a and 310d with container platform operation labels 303a and 303d. The container platform operation labels 303a and 303d indicate the identified subset of the plurality of servers 310a and 310d is underutilized. In contrast, the workload manager 103 generates a container platform operation label of "available" 303b and 303c for the server 310b and 310c, respectively. The workload manager 103 labels the server 310b with a container platform operation label 303b. Similarly, the workload manager 103 labels the server 310c with a container platform operation label 303c. The container platform operation labels 303b and 303c indicate the servers 310b and 310c are available.

By using container platform operation labels, a workload scheduled on the container platform migrates to one of the plurality of servers based on the container platform operation labels, so that the plurality of servers 310(a-d) can run at optimum capacity. For examples as shown in FIG. 3, by using container platform operation labels, the container 302a migrates from the server 310a (labelled as being "underutilized") to the server 310b and/or 310c (labelled as being "available"). The container 302d migrates from the server 310d (labelled as being "underutilized") to the server 310b and/or 310c (labelled as being "available"). As a result, the servers 310a and 310d are drained of workloads. The servers 310a and 310d may be shut down after all current workloads are drained from the underutilized server 310a and 310d. As used herein, "draining workloads from a server" refers to removing one or more current workloads (e.g., every current workload) from the server. The phrase "removing workloads from a server" refers to reallocating, deleting, or otherwise disposing of a workload allocated to a server. The phrase "reallocating workloads from a server" refers to moving a workload from a server to a different computing instance.

In some examples, a relatively long-running workload migrates to one of the plurality of servers 310(a-d) based on a first set of criteria and a relatively short-running workload migrates to one of the plurality of servers based on a second set of criteria different from the first set of criteria. The phrase "relatively long-running workload", as used herein, refers to workloads that have a processing time that is longer than a known mean/average processing time for workloads on a given server, e.g., workloads that run longer than a server's average workload processing time. A "relatively short-running workload", as used herein, refers to workloads that have a processing time that is shorter than a known mean/average processing time for workloads on a given server, i.e., workloads that run shorter than a server's average workload processing time. For example, the under-utilized server 310a comprises a relatively long-running workload in the container 302a (I) and a relatively short-running workload in the container 302a(s). The relatively long-running workload 302a (I) migrates to the server 310c based on the first set of criteria. The relatively short-running workload 302a(s) migrates to the server 310b based on the second set of criteria.

FIG. 4 illustrates a flow diagram of a computerized method 400 to manage workloads in accordance with an example. Method 400 may be performed by a system comprising a plurality of servers configured to process workloads in a cloud computing environment.

At step 410, a management interface collects energy consumption information associated with a plurality of servers processing workloads in a cloud computing environment. For example, the management interface may be configured to monitor energy consumption in (and/or receive energy consumption information from) the plurality of servers. As discussed above, the energy consumption information for the plurality of servers comprises information regarding energy consumed by a CPU, a GPU, a memory resource, a fan, a server infrastructure, a complete server lifecycle, or any combination thereof. Examples of server infrastructure that consume energy (outside of CPUs, GPUs, and DRAMs) include system boards, cooling devices such as fans or water coolers, and other components.

At step 420, an energy consumption manager calculates carbon cost metrics for the plurality of servers based on the energy consumption information. As mentioned above, the term "carbon cost metrics", as used herein, refers to a quantification of costs associated with various aspects of a "carbon footprint", i.e., a measurement of the amount of carbon dioxide and other carbon compounds emitted due to an energy consumption activity (e.g., cloud-based computing). For example, the energy consumption manager may be configured to be in communication with the management interface to receive energy consumption information. In some examples, the carbon cost metrics for the plurality of servers may comprise one or more of the following: a carbon cost per CPU, a carbon cost per GPU, a carbon cost per megabyte of network read data, a carbon cost per megabyte of network write data, a carbon cost per megabyte of read data storage, a carbon cost per megabyte of write data storage, a carbon cost per megabyte of memory used, or a carbon cost of a complete server lifecycle.

In some examples, the plurality of servers includes at least a first type of server and a second type of server different from the first type server. In such instances, one or more carbon cost metrics for the first type of server may be weighted differently than the carbon cost metrics for the second type of server. In some examples, the management interface collects instantaneous energy consumption values for the plurality of servers over a consumption period. The energy consumption manager calculates the carbon cost metrics for the plurality of servers by summing the instantaneous energy consumption values for one or more of the plurality of servers over the consumption period. As discussed above, the instantaneous energy consumption values for the plurality of servers may comprise, for example: instantaneous CPU consumption values, instantaneous GPU consumption values, or instantaneous memory resource consumption values. The consumption period can be a second, a minute, an hour, or a day. If the consumption period is one second, the instantaneous consumption values are in terms of Watts of electricity.

At step 430, based on the carbon cost metrics for the plurality of servers, the energy consumption manager identifies a subset of the plurality of servers as being underutilized.

At step 440, the energy consumption manager calculates an overall carbon cost of the plurality of servers based on the carbon cost metrics.

At step 450, when the overall carbon cost of the servers is below a threshold value, a workload manager generates container platform operation labels for the plurality of servers.

At step 460, the workload manager labels the identified subset of the plurality of servers with container platform operation labels. The container platform operation labels indicate that the identified subset of the plurality of servers is underutilized.

At step 470, the workload manager labels one or more of the plurality of servers not identified as being underutilized with container platform operation labels. The container platform operation labels indicate that the one or more of the plurality of servers is available. As a result, a workload scheduled on the container platform migrates to one of the plurality of servers based on the container platform operation labels.

In some examples, the workload manager migrates the workload scheduled on the container platform from a server labelled as being underutilized to a server labelled as being available. In some examples, the workload manager drains workloads from the identified subset of servers labelled as being underutilized.

In some examples, the workload manager migrates a relatively long-running workload to one of the plurality of servers based on a first set of criteria. In some examples, the workload manager migrates a relatively short-running workload to one of the plurality of servers based on a second set of criteria different from the first set of criteria.

FIG. 5 illustrates a computer-readable medium facilitate managing workloads in accordance with an example. In various examples, instructions for performing the various methods herein are stored on a non-transitory computer-readable medium, e.g., computer readable medium (CRM) 500. The non-transitory computer readable medium 500 comprises computer executable instructions stored thereon. The computer executable instructions are executed by at least one processor.

The CRM 500 may include one or more instructions 510 for collecting energy consumption information associated with a plurality of servers. The plurality of servers is configured to process workloads in a cloud computing environment. For example, a management interface may be configured to monitor energy consumption in (and/or receive energy consumption information from) the plurality of servers. In some examples, the energy consumption information for the plurality of servers comprises information regarding energy consumed by a CPU, a GPU, a memory resource, a fan, a server infrastructure, a complete server lifecycle, or any combination thereof. Examples of server infrastructure that consumes energy (outside of CPUs, GPUs, and DRAMs) include system boards, cooling devices such as fans or water coolers, and other components.

The CRM 500 may include one or more instructions 520 for calculating carbon cost metrics for the plurality of servers based on the energy consumption information. For example, an energy consumption manager may be configured to be in communication with the management interface to receive energy consumption information. In some examples, the carbon cost metrics for the plurality of servers may comprise one or more of the following: a carbon cost per CPU, a carbon cost per GPU, a carbon cost per megabyte of network read data, a carbon cost per megabyte of network write data, a carbon cost per megabyte of read data storage, a carbon cost per megabyte of write data storage, a carbon cost per megabyte of memory used, or a carbon cost of a complete server lifecycle.

In some examples, the plurality of servers includes at least a first type of server and a second type of server different from the first type server. In such instances, one or more carbon cost metrics for the first type of server may be weighted differently than the carbon cost metrics for the second type of server. In some examples, the management interface is configured to monitor server energy consumption over a time interval. The carbon cost metrics are calculated based on a fractional energy utilization of workloads on servers. In some examples, the management interface collects instantaneous energy consumption values for the plurality of servers over a consumption period. The energy consumption manager calculates the carbon cost metrics for the plurality of servers by summing the instantaneous energy consumption values for one or more of the plurality of servers over the consumption period. As discussed above, the instantaneous energy consumption values for the plurality of servers may comprise, for example: instantaneous CPU consumption values, instantaneous GPU consumption values, or instantaneous memory resource consumption values. The consumption period can be a second, a minute, an hour, or a day. If the consumption period is one second, the instantaneous consumption values are in terms of Watts of electricity.

The CRM 500 may include one or more instructions 530 for identifying a subset of the plurality of servers as being underutilized based on the carbon cost metrics for the plurality of servers.

The CRM 500 may include one or more instructions 540 for calculating an overall carbon cost of the plurality of servers based on the carbon cost metrics.

The CRM 500 may include one or more instructions 550 for generating container platform operation labels for the plurality of servers, when the overall carbon cost of the servers is below a threshold value.

The CRM 500 may include one or more instructions 560 for labeling the identified subset of the plurality of servers with container platform operation labels. The container platform operation labels indicate that the identified subset of the plurality of servers is underutilized.

The CRM 500 may include one or more instructions 570 for labeling one or more of the plurality of servers not identified as being underutilized with container platform operation labels. The container platform operation labels indicate that the one or more of the plurality of servers is available. As a result, a workload scheduled on the container platform migrates to one of the plurality of servers based on the container platform operation labels.

In some examples, the CRM 500 may include one or more instructions for migrating the workload scheduled on the container platform from a server labelled as underutilized to a server labelled as available. In some examples, the CRM 500 may include one or more instructions for draining workloads and shutting down the identified subset of servers labelled as being underutilized.

In some examples, the CRM 500 may include one or more instructions for migrating a relatively long-running workload to one of the plurality of servers based on a first set of criteria. In some examples, the CRM 500 may include one or more instructions for migrating a relatively short-running workload to one of the plurality of servers based on a second set of criteria different from the first set of criteria.

Figure 6:
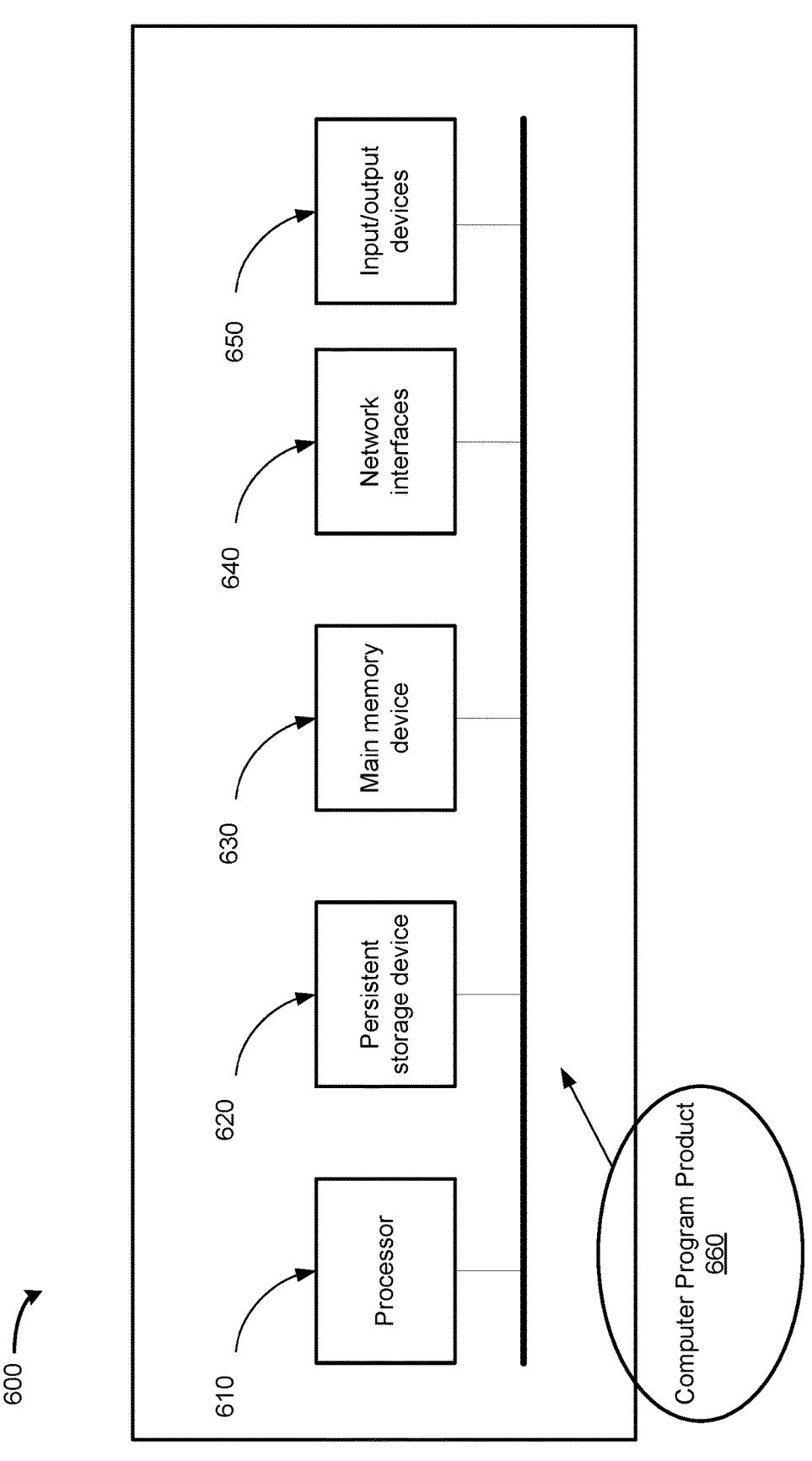
FIG. 6 illustrates a block diagram of a distributed computer system that can be used for implementing one or more aspects of the various examples.

FIG. 6 illustrates a block diagram of a distributed computer system that can be used for implementing one or more aspects of the various examples. Apparatus 600 comprises a processor 610 operatively coupled to a persistent storage device 620 and a main memory device 630. Processor 610 may include both general and special purpose microprocessors and may be the sole processor or one of multiple processors of apparatus 600. Processor 610 may comprise one or more CPUs, and one or more GPUs, which, for example, may work separately from and/or multi-task with one or more CPUs to accelerate processing. Processor 610 controls the overall operation of apparatus 600 by executing computer program instructions that define such operations. The computer program instructions may be stored in persistent storage device 620, or other computer-readable medium, and loaded into main memory device 630 when execution of the computer program instructions is desired. For example, servers (servers 110(*a-n*) shown in FIG. 1, servers 200 shown in FIG. 2, and servers 310(*a-d*) shown in FIG. 3) may comprise one or more components of apparatus 600. Thus, the various method steps of FIG. 3 herein can be defined by the computer program instructions stored in main memory device 630 and/or persistent storage device 620 and controlled by processor 610 executing the computer program instructions. For example, the computer program instructions can be implemented as computer executable code programmed by one skilled in the art to perform an algorithm defined by the method steps of FIG. 3 herein. Accordingly, by executing the computer program instructions, processor 610 executes an algorithm defined by the method steps herein. Additionally, or alternatively, instructions for implementing the method steps of FIG. 3 herein in accordance with disclosed examples may reside in computer program product 660. When processor 610 is executing the instructions of computer program product 660, the instructions, or a portion thereof, are typically loaded into main memory device 630 from which the instructions are readily accessed by processor 610.

Apparatus 600 also includes one or more network interfaces 640 for communicating with other servers and databases in a cloud computing environment via a network. Apparatus 600 may also include one or more input/output devices 650 that enable user interaction with apparatus 600 (e.g., a display, a keyboard, a mouse, speakers, buttons, etc.).

As discussed above, energy consumption information for the servers may comprise consumption information related to CPUs, GPUs, memory resources, or other cloud-computing elements. For example, energy consumption information may comprise energy consumed by a CPU in the processor 610, a complete server lifecycle, an infrastructure, a GPU in the processor 610, a memory resource in the memory device 630, a fan, or any combination thereof.

Carbon cost metrics for the servers may comprise, for example, any of the following: a carbon cost per CPU in the processor 610, a carbon cost per GPU in the processor 610, a carbon cost of a complete server lifecycle, a carbon cost per megabyte of network read/write data in the one or more network interfaces 640, a carbon cost per megabyte of read/write data storage in the persistent storage device 620, or a carbon cost per megabyte of memory used in the memory device 630.

Processor 610, persistent storage device 620, and/or main memory device 630 may include, be supplemented by, or incorporated in, one or more application-specific integrated circuits (ASICs) and/or one or more field programmable gate arrays (FPGAs).

Persistent storage device 620 and main memory device 630 each comprise a tangible non-transitory computer readable storage medium. Persistent storage device 620, and main memory device 630, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EE-PROM), compact disc read-only memory (CD-ROM), digital versatile disc read-only memory (DVD-ROM) disks, or other non-volatile solid state storage devices.

Input/output devices 650 may include peripherals. For example, input/output devices 650 may include a display device such as a cathode ray tube (CRT), plasma or liquid crystal display (LCD) monitor for displaying information (e.g., a list of currently connected nodes in a CaaS platform) to a user, a keyboard, and a pointing device such as a mouse or a trackball by which the user can provide input to apparatus 600.

Any or all of the systems and apparatuses discussed herein, including the cloud computing environment 100, may be performed by, and/or incorporated in, an apparatus such as apparatus 600.

One skilled in the art will recognize that an implementation of an actual computer or computer system may have other structures and may contain other components as well (e.g., batteries, fans, motherboards, power supplies, etc.), and that FIG. 6 is a high-level representation of some of the components of such a computer for illustrative purposes.

The various examples are described herein with reference to the accompanying drawings, which form a part hereof, and which show, by way of illustration, specific ways of practicing the examples. This specification may, however, be construed in many different forms and should not be construed as being limited to the examples set forth herein; rather, these examples are provided so that this specification will be thorough and complete, and will fully convey the scope of the examples to those skilled in the art. Among other things, this specification may be implemented as methods or devices. Accordingly, any of the various examples herein may take the form of an entirely hardware example, an entirely software example or an example combining software and hardware aspects. The specification is, therefore, not to be taken in a limiting sense.

Throughout the specification and claims, the following terms take the meanings explicitly associated herein, unless the context clearly dictates otherwise:

The phrase "in an example" as used herein does not necessarily refer to the same example, though it may. Thus, as described above, various examples may be readily combined, without departing from the scope or spirit thereof.

As used herein, the term "or" is an inclusive "or" operator and is equivalent to the term "and/or," unless the context clearly dictates otherwise.

The term "based on" is not exclusive and allows for being based on additional factors not described, unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

In addition, throughout the specification, the meaning of "a", "an", and "the" includes plural references, and the meaning of "in" includes "in" and "on".

Although some of the various examples presented herein constitute a single combination of inventive elements, it should be appreciated that the inventive subject matter is considered to include all possible combinations of the disclosed elements. As such, if one example comprises elements A, B, and C, and another example comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

Throughout the above discussion, numerous references have been made regarding servers, services, interfaces, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be realized as a computer program product comprising a non-transitory, tangible computer readable medium storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, server, device, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices, including servers, interfaces, systems, databases, agents, peers, controllers, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.), and may comprise various other components such as batteries, fans, motherboards, power supplies, etc. The software instructions configure or program the computing device to provide the roles, responsibilities, or other functionality as discussed below with respect to the disclosed apparatus. Further, the disclosed technologies can be realized as a computer program product that includes a non-transitory computer readable medium storing the software instructions that causes a processor to execute the disclosed steps associated with implementations of computer-based algorithms, processes, methods, or other instructions. In some examples, the various servers, systems, databases, or interfaces exchange data using standardized protocols or algorithms, possibly based on HTTP, HTTPS, AES, public-private key exchanges, web service APIs, or other electronic information exchanging methods. Data exchanges among devices can be conducted over a packet-switched network, the Internet, LAN, WAN, VPN, or other type of packet switched network; a circuit switched network; cell switched network; or other type of network.

The foregoing specification is to be understood as being in every respect illustrative, but not restrictive, and the scope of the examples disclosed herein is not to be determined from the specification, but rather from the claims as interpreted according to the full breadth permitted by the patent laws. It is to be understood that the examples shown and described herein are illustrative of the principles of the present disclosure and that various modifications may be implemented by those skilled in the art without departing from the scope and spirit of the disclosure. Those skilled in the art could implement various other feature combinations without departing from the scope and spirit of the disclosure.

The invention claimed is:

1. A computerized method comprising:
collecting, by a management interface configured to monitor energy consumption of servers in a cloud computing environment, energy consumption information associated with a plurality of servers processing workloads in the cloud computing environment by obtaining, by the management interface, instantaneous energy consumption values for central processing units (CPUs), graphics processing units (GPUs), and memory devices of the servers;
calculating, by an energy consumption manager in communication with the management interface, carbon cost metrics for the plurality of servers based on the energy consumption information, the carbon cost metrics being weighted according to different types of servers;
identifying, by the energy consumption manager, a subset of the plurality of servers as being underutilized based on the carbon cost metrics and hardware utilization ratios;
calculating, by the energy consumption manager, an overall carbon cost of the plurality of servers based on the carbon cost metrics;
generating, by a workload manager, container platform operation labels for the plurality of servers responsive to the overall carbon cost being below the threshold value, the container platform operation labels comprising labels indicating whether a server is underutilized or available;
labelling the identified subset of the plurality of servers with container platform operation labels indicating that the identified subset of the plurality of servers is underutilized;
labelling one or more of the plurality of servers not identified as being underutilized with container platform operation labels indicating that the one or more of the plurality of servers is available; and
reducing energy consumption and carbon emissions of the cloud computing environment by migrating, by a non-transitory computer-readable medium on one or more of the servers based on the container platform operation labels, a workload executing on a server labelled as underutilized to a server labelled as available.

2. The method of claim 1, further comprising migrating the workload by migrating a workload scheduled on the container platform from a server labelled as being underutilized to a server labelled as being available.

3. The method of claim 1, further comprising draining workloads from the identified subset of the servers labelled as being underutilized.

4. The method of claim 1, further comprising at least one of:
migrating a relatively long-running workload to one of the plurality of servers based on a first set of criteria; or
migrating a relatively short-running workload to one of the plurality of servers based on a second set of criteria different from the first set of criteria.

5. The method of claim 1, wherein the plurality of servers includes at least a first type of server and a second type of server different from the first type server, the carbon cost metrics for the first type of server being weighted differently from the carbon cost metrics for the second type of server.

6. The method of claim 1, further comprising:
collecting, by the management interface, the instantaneous energy consumption values for the plurality of servers for a consumption period.

7. The method of claim 6, further comprising calculating the carbon cost metrics for the plurality of servers by summing the instantaneous energy consumption values for one or more of the plurality of servers over the consumption period.

8. The method of claim 1, wherein the energy consumption information for the plurality of servers comprises information regarding energy consumed by at least one of a CPU, a complete server lifecycle, or an infrastructure.

9. The method of claim 1, wherein the energy consumption information for the plurality of servers comprises information regarding energy consumed by at least one of a GPU, a memory resource, or a fan.

10. The method of claim 1, wherein the carbon cost metrics for the plurality of servers comprise at least one of the following: a carbon cost per CPU, a carbon cost per GPU, or a carbon cost of a complete server lifecycle.

11. The method of claim 1, wherein the carbon cost metrics for the plurality of servers comprise at least one of the following: a carbon cost per megabyte of network read/write data, a carbon cost per megabyte of read/write data storage, or a carbon cost per megabyte of memory used.

12. The method of claim 1, wherein calculating carbon cost metrics for the plurality of servers further comprises calculating an active number of cores, AC, in a server of the plurality of servers as $$AC = \frac{CPUUtil \times TCC}{100} + 1$$

wherein CPUUtil is CPU utilization of the server and TCC is a total number of cores in the server that are available for executing workloads.

13. A system, comprising:

one or more processors and one or more non-transitory memories storing computer-readable instructions that, when executed by the one or more processors, cause the one or more processors to:

collect, by a management interface configured to monitor energy consumption of servers in a cloud computing environment, energy consumption information associated with a plurality of servers processing workloads in the cloud computing environment by obtaining, by the management interface, instantaneous energy consumption values for central processing units (CPUs), graphics processing units (GPUs), and memory devices of the servers;

calculate, by an energy consumption manager in communication with the management interface, carbon cost metrics for the plurality of servers based on the energy consumption information, the carbon cost metrics being weighted according to different types of servers;

identify, by the energy consumption manager, a subset of the plurality of servers as being underutilized based on the carbon cost metrics and hardware utilization ratios;

calculate, by the energy consumption manager, an overall carbon cost of the plurality of servers based on the carbon cost metrics;

generate, by a workload manager, container platform operation labels for the plurality of servers responsive to the overall carbon cost being below the threshold value, the container platform operation labels comprising labels indicating whether a server is underutilized or available;

label the identified subset of the plurality of servers with container platform operation labels indicating that the identified subset of the plurality of servers is underutilized;

label one or more of the plurality of servers not identified as being underutilized with container platform operation labels indicating that the one or more of the plurality of servers is available; and reducing energy consumption and carbon emissions of the cloud computing environment by migrating, by a non-transitory computer-readable medium on one or more of the servers based on the container platform operation labels, a workload executing on a server labelled as underutilized to a server labelled as available.

14. The system of claim 13, further comprising instructions causing the one or more processors to migrate the workload by migrating a workload scheduled on the container platform from a server labelled as underutilized to a server labelled as available.

15. The system of claim 13, further comprising instructions causing the one or more processors to shut down the identified subset of the servers labelled as being underutilized.

16. The system of claim 13, further comprising instructions causing the one or more processors to at least one of:

migrate a relatively long-running workload to one of the plurality of servers based on a first set of criteria; or migrate a relatively short-running workload to one of the plurality of servers based on a second set of criteria different from the first set of criteria.

17. The system of claim 13, wherein the plurality of servers includes at least a first type of server and a second type of server different from the first type server, the carbon cost metrics for the first type of server being weighted differently than the carbon cost metrics for the second type of server.

18. The system of claim 13, further comprising instructions that cause the one or more processors to:

collect, by the management interface, the instantaneous energy consumption values for the plurality of servers for a consumption period.

19. The system of claim 18, wherein calculating the carbon cost metrics for the plurality of servers comprises summing the instantaneous energy consumption values for one or more of the plurality of servers over the consumption period.

20. The system of claim 13, wherein the energy consumption information for the plurality of servers comprises information regarding energy consumed by at least one of the following: a CPU, a memory resource, or a fan.

21. The system of claim 13, wherein the energy consumption information for the plurality of servers comprises information regarding energy consumed by at least one of the following: a GPU, an infrastructure, or a complete server lifecycle.

22. The system of claim 13, wherein the carbon cost metrics for the plurality of servers comprises at least one of the following: a carbon cost per CPU, a carbon cost per megabyte of network read/write data, a carbon cost per megabyte of read/write data storage, or a carbon cost per megabyte of memory used.

23. The system of claim 13, wherein the carbon cost metrics for the plurality of servers comprises at least one of the following: a carbon cost per GPU or a carbon cost of a complete server lifecycle.

24. The system of claim 13, wherein the instructions causing the one or more processors to calculate carbon cost metrics for the plurality of servers further comprise instructions causing the one or more processors to calculate active number of cores, AC, in a server of the plurality of servers as $$AC = \frac{CPUUtil \times TCC}{100} + 1$$

wherein CPUUtil is CPU utilization of the server and TCC is a total number of cores in the server that are available for executing workloads.

25. A non-transitory computer-readable medium comprising computer-executable instructions stored thereon that, when executed by at least one processor, cause the at least one processor to:

collect, by a management interface configured to monitor energy consumption of servers in a cloud computing environment, energy consumption information associated with a plurality of servers processing workloads in the cloud computing environment by obtaining, by the management interface, instantaneous energy consumption values for central processing units (CPUs), graphics processing units (GPUs), and memory devices of the servers;

calculate, by an energy consumption manager in communication with the management interface, carbon cost metrics for the plurality of servers based on the energy consumption information, the carbon cost metrics being weighted according to different types of servers;

identify, by the energy consumption manager, a subset of the plurality of servers as being underutilized based on the carbon cost metrics and hardware utilization ratios;

calculate, by the energy consumption manager, an overall carbon cost of the plurality of servers based on the carbon cost metrics;

generate, by a workload manager, container platform operation labels for the plurality of servers responsive to the overall carbon cost being below the threshold value, the container platform operation labels comprising labels indicating whether a server is underutilized or available;

label the identified subset of the plurality of servers with container platform operation labels indicating that the identified subset of the plurality of servers is underutilized;

label one or more of the plurality of servers not identified as being underutilized with container platform operation labels indicating that the one or more of the plurality of servers is available; and reducing energy consumption and carbon emissions of the cloud computing environment by migrating, by a non-transitory computer-readable medium on one or more of the servers based on the container platform operation labels, a workload executing on a server labelled as underutilized to a server labelled as available.

26. The non-transitory computer readable medium of claim 25, further comprising instructions causing the one or more processors to: migrate the workload by migrating a workload scheduled on the container platform from a server labelled as underutilized to a server labelled as available.

27. The non-transitory computer readable medium of claim 25, further comprising instructions causing the one or more processors to: drain of workloads from and shut down the identified subset of the servers labelled as being underutilized.

28. The non-transitory computer readable medium of claim 25, further comprising instructions causing the one or more processors to:

migrate a relatively long-running workload to one of the plurality of servers based on a first set of criteria; and migrate a relatively short-running workload to one of the plurality of servers based on a second set of criteria different from the first set of criteria.

29. The non-transitory computer readable medium of claim 25, wherein the plurality of servers includes at least a first type of server and a second type of server different from the first type server, the carbon cost metrics for the first type of server being weighted differently than the carbon cost metrics for the second type of server.

30. The non-transitory computer readable medium of claim 25, wherein the computer-executable instructions comprise further instructions that cause the one or more processors to:

collect, by the management interface, the instantaneous energy consumption values for the plurality of servers for a consumption period.

31. The non-transitory computer readable medium of claim 30, wherein calculating the carbon cost metrics for the plurality of servers comprises summing the instantaneous energy consumption values for a respective server over the consumption period.

32. The non-transitory computer readable medium of claim 25, wherein the energy consumption information for the plurality of servers comprises information regarding energy consumed by at least one of the following: a CPU, or a memory resource.

33. The non-transitory computer readable medium of claim 25, wherein the energy consumption information for the plurality of servers comprises information regarding energy consumed by at least one of the following: a GPU, a fan, an infrastructure, or a complete server lifecycle.

34. The non-transitory computer readable medium of claim 25, wherein the carbon cost metrics for the plurality of servers comprise at least one of the following: a carbon cost per CPU, or a carbon cost of a complete server lifecycle.

35. The non-transitory computer readable medium of claim 25, wherein the carbon cost metrics for the plurality of servers comprise at least one of the following: a carbon cost per GPU, a carbon cost per megabyte of network read/write data, a carbon cost per megabyte of read/write data storage, or a carbon cost per megabyte of memory used.

36. The non-transitory computer readable medium of claim 25, wherein the instructions causing the one or more processors to calculate carbon cost metrics for the plurality of servers further comprise instructions causing the one or more processors to calculate an active number of cores, AC, in a server of the plurality of servers as $$AC = \frac{CPUUtil \times TCC}{100} + 1$$

wherein CPUUtil is CPU utilization of the server and TCC is a total number of cores in the server that are available for executing workloads.

* * * * *